United States Patent [19]

Yamazaki et al.

[11] Patent Number: 5,420,706
[45] Date of Patent: May 30, 1995

[54] ELECTRO-OPTICAL DEVICE HAVING IMPROVED LIGHT SHIELDING AND METHOD FOR FORMING THE SAME

[75] Inventors: Shunpei Yamazaki, Tokyo; Toshimitsu Konuma, Kanagawa, both of Japan

[73] Assignee: Semiconductor Energy Laboratory Co., Ltd., Kanagawa, Japan

[21] Appl. No.: 992,908

[22] Filed: Dec. 18, 1992

[30] Foreign Application Priority Data

Dec. 26, 1991 [JP] Japan .................. 3-358705

[51] Int. Cl.[6] .......................................... G02F 1/1335
[52] U.S. Cl. .......................................... 359/67; 359/51
[58] Field of Search .................. 359/54, 67, 80, 81, 359/62, 51

[56] References Cited

U.S. PATENT DOCUMENTS

| | | | |
|---|---|---|---|
| 4,591,240 | 5/1986 | Masaki et al. | 359/67 |
| 4,600,274 | 7/1986 | Morozumi | 359/67 |

FOREIGN PATENT DOCUMENTS

| | | | |
|---|---|---|---|
| 0034520 | 2/1982 | Japan | 359/67 |
| 0015522 | 1/1987 | Japan | 359/62 |
| 0078531 | 4/1987 | Japan | 359/80 |
| 0061729 | 3/1989 | Japan | 359/80 |
| 3166515 | 7/1991 | Japan | 359/51 |

*Primary Examiner*—William L. Sikes
*Assistant Examiner*—Huy Mai
*Attorney, Agent, or Firm*—Sixbey, Friedman, Leedom & Ferguson; Gerald J. Ferguson, Jr.; Eric J. Robinson

[57] ABSTRACT

A polymer-dispersed liquid crystal electro-optical device which realizes a super-fine display, comprising a pair of light-transmitting substrates having provided thereon a plurality of electrodes being arranged in such a manner that the surfaces having the electrodes face each other, and an electro-optical modulating layer being incorporated between said pair of substrates, said electro-optical modulating layer comprising a liquid crystal material having anisotropy in refractive index and said liquid crystal material being arranged in such a manner that the major axes of the liquid crystal molecules show random orientation, so that the amount of transmitted light can be controlled by causing light scattering on its passing through the electro-optical modulating layer, wherein, a light shield portion having a height H is provided among said plurality of electrodes in such a manner that the height H satisfies a relation $$2(D-H)\tan\theta < L$$

where, D is a distance between the pair of light-transmitting substrates facing each other; L is a width of the light shield portion; and $\theta$ is the angle of light scattering of the electro-optical modulating layer.

24 Claims, 5 Drawing Sheets

ELECTRO-OPTICAL DEVICE HAVING IMPROVED LIGHT SHIELDING AND METHOD FOR FORMING THE SAME

BACKGROUND OF THE INVENTION

1. Field of the Invention

The present invention relates to an electro-optical device which provides fine display images. More specifically, it relates to a dispersion type liquid crystal electro-optical device (polymer-dispersion liquid crystal (PDLC) electro-optical device) comprising a plurality of electrodes having incorporated therebetween light shielding portions having specified height.

2. Prior Art

Liquid crystal displays are now replacing conventional display devices such as televisions equipped with cathode ray tubes (CRTs), because liquid crystal displays are thinner, compact, light weight, and consume low power. With progress in technology, liquid crystal displays operating in an STN (super twisted nematic) type mode have become dominant over those of a TN (twisted nematic) type mode, and also their use has extended widely from watches to the field of word processors and liquid crystal television sets.

It is indispensable in those displays, however, to incorporate one or two polarizer sheets in the liquid crystal cell. Because the light transmittance per polarizer sheet is as low as in the range of from 40 to 50%, the light transmittance of a TN type display using the polarizer sheet(s) as a result falls to a low 10 to 30% even in the bright state (the state of transmitting light). Accordingly, an additional backlighting is requisite to compensate for the optical loss to lighten the dark display.

Recently, polymer-dispersed liquid crystals free from the aforementioned polarizer sheets and which provide bright displays of high contrast images are studied more extensively. This type of liquid crystal comprises an electro-optical modulating layer based on a transparent solid phase polymer having dispersed therein granular or sponge-like nematic, cholesteric, or smectic liquid crystal materials. A known process for fabricating an electro-optical device of this type comprises dispersing liquid crystals in a polymer by encapsulating the liquid crystal, and then establishing the polymer as a thin film on a film or a substrate. Proposed materials for encapsulating the liquid crystal include gelatin, gum arabic, and poly(vinyl alcohol).

For instance, liquid crystal molecules being encapsulated in poly(vinyl alcohol) and having a positive dielectric anisotropy arrange themselves along a single direction on applying an external electric field, in such a manner that the molecules orient their major axes along the direction parallel to the direction of the electric field. If the refractive index of the oriented liquid crystal molecules is equal to that of the polymer, a light can pass straight forward through this portion. Hence, in this case, light can be transmitted through this portion.

If no external electric field is applied to the liquid crystal, the liquid crystal molecules do not take a particular arrangement and the major axes thereof yield a random orientation. Accordingly, the refractive index of the polymer becomes different from that of the liquid crystal. Thus, in this case, a light passing through this portion is scattered that the liquid crystal exhibits an opaque (milky white) appearance.

PDLC electro-optical devices are not only confined to those comprising encapsulated liquid crystals as described above, but also various others of this type are known to the present. PDLC electro-optical devices include those comprising an electro-optical modulating layer which takes advantage of, for example, an epoxy resin having dispersed therein liquid crystals, a phase separation between the liquid crystal and a photo-curable resin, a three-dimensionally connected polymer having impregnated with liquid crystal, and a cholesteric/nematic phase transition. All those are collectively referred to as PDLC electro-optical device in the present invention.

In a PDLC electro-optical device of this type, as mentioned hereinbefore, the liquid crystal molecules arrange themselves in such a manner that the major axes of the molecules take a random orientation. Accordingly, a light incident to this portion is scattered and changes its optical path upon passing through the liquid crystal system. A PDLC electro-optical device having a plurality of electrodes and driven by a matrix provides superfine displays. Those displays may be driven in various manners, for example, by a simple matrix obtained by patterning a transparent electrode and by thin film transistors (TFTs) provided in each of the pixels. At any rate, because such PDLC electro-optical devices deal a large information with a superfine display, they comprise pixels in high integration. Hence, the distance between the pixels becomes very short.

In a well-known type of liquid crystal displays driven by TFTs, black stripes as light shields are provided between the pixels to prevent light from leaking, because the liquid crystal cannot be controlled at portions between the pixels. The black stripes are provided, for example, by printing black pigments, by patterning pigments using photographic processes, and by film depositing and patterning light-shielding metals such as aluminum and chromium. Those black stripes prevent the leak light from being transmitted between the pixels.

In a conventional type of liquid crystal electro-optical device using a nematic liquid crystal, the light incident to the device from the light source provided on the back of the device passes straight forward through the pixels without considerably deviating its light path. An 'OFF' state can be selected from an 'ON' state by cutting off the light path with a plane of a desired pixel. In this manner, the light corresponding to the neighboring pixels can be distinguished by the pixel having turned 'OFF' and a black plane (thin) stripe which prevents light leakage from occurring between the pixels. A thin film of a metal having a thickness of from 500 to 1000 Å and having a low light transmittance works sufficiently as a light shield.

A PDLC electro-optical device, however, is different from the aforementioned liquid crystal electro-optical device operating on a TN mode. That is, the 'OFF's and 'ON's of a PDLC electro-optical device are realized by whether the incident light is scattered or is allowed to pass straight forward through the cell. In a PDLC electro-optical device having a 500 Å thick thin film of a metal as a black stripe, for example, the light being scattered from the neighboring pixels mix to result in not only leak light but also blurring of image. Accordingly, the black stripe no longer functions as a light shield.

Optical switching of a PDLC electro-optical device is realized between a state of scattering the light and a state of transmitting the light. The former state can be obtained by changing the light path of the light passing through the electro-optical modulating layer by taking advantage of a random orientation of liquid crystal molecules having anisotropy of refractive index. The latter state can be achieved by applying an external electric field to the electro-optical modulating layer so as to arrange the liquid crystal molecules in one direction, so that the light passing through the electro-optical modulating layer may proceed straight forward along the direction of incidence without being scattered. Accordingly, the black stripes for use as light shields are not effective for a PDLC electro-optical devices. That is, the problem resides in the fact that a black stripe, which is a plane extending in two dimensions, is used as a light shield for a light spreading in three dimensions.

SUMMARY OF THE INVENTION

The present invention provides a PDLC electro-optical device comprising a three-dimensionally spreading light shield. More specifically, the polymer-dispersed liquid crystal electro-optical device according to the present invention comprises, between the pixels, a light shield having a specified height to prevent scattered light from entering the desired pixel, thereby reducing blurring.

An electro-optical device in accordance with the present invention comprises:
- a pair of substrates;
- a plurality of electrodes provided on one of said substrates;
- an electro-optical modulating layer provided between said substrates and comprising liquid crystal molecules; and
- a part (hereinafter, referred to as light shield) for preventing transmission of a light, said part being provided between two of said electrodes or on one of said electrodes and having a height H satisfying relation $2(D-H)\tan\theta < L$ where D is a distance between said substrates, L is a width of said part, and $\theta$ is a diffusion angle (scattering angle) when major axes of said liquid crystal molecules are at random.

DETAILED DESCRIPTION OF THE PRESENT INVENTION

Figure 2:
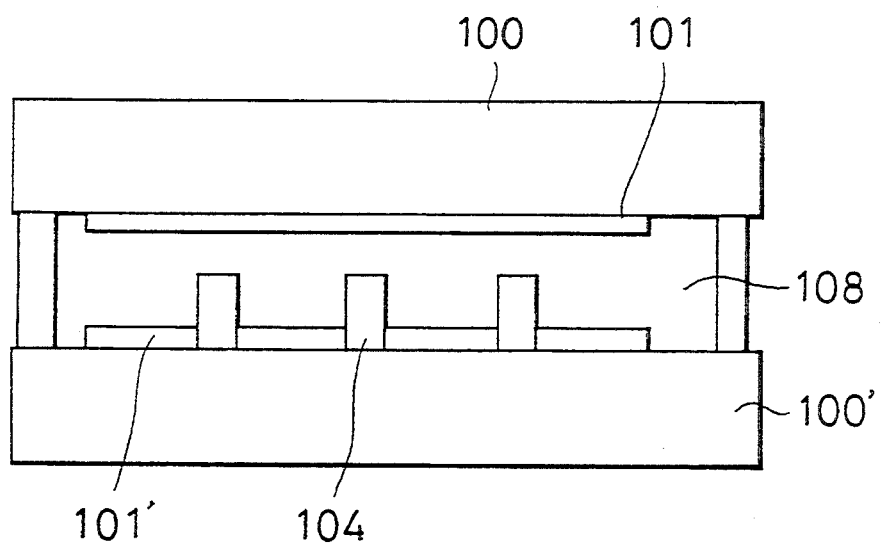
FIG. 2 shows a cross sectional view of a PDLC cell according to the present invention.

Referring to FIG. 2, a PDLC electro-optical device according to the present invention is described in detail below.

The light shield having a specified height to prevent scattered light from entering the desired pixel as mentioned above can be provided by setting the parameters for the electro-optical modulating layer 108, light shield 104, and the apparent angle of scattering in the electro-optical modulating layer as given in Table 1 below.

TABLE 1

| | |
|---|---|
| Thickness of the electro-optical modulating layer of the PDLC electro-optical device | D ($\mu$m) |
| Width of the black stripes provided between the pixels | L ($\mu$m) |
| Height of the black stripes | H ($\mu$m) |
| Angle of scattering in the electro-optical modulating layer | $\theta$ (degree) |

A transmitted light at the vicinity of a pixel is scattered at an amount corresponding to the thickness (D-H) (the thickness which remains after subtracting the thickness of the light shield 104 from the thickness of the electro-optical modulating layer 108). The distance of scattering can be expressed by Eq. (1) below:

$$(D-H)\tan\theta \qquad (1)$$

Because light is scattered simultaneously from the two pixels neighboring to the light shield 104 in the electro-optical modulating layer, relation (2) must be satisfied so that the light scattered from the neighboring two pixels may not be superposed on the light shield 104.

$$L > 2(D-H)\tan\theta \qquad (2)$$

If the parameters above fulfill this relation, the light beams having transmitted through the two different pixels in the electro-optical modulating layer are separated from each other. Accordingly, two different pixels are recognized. In the conventional liquid crystal devices having low light shields, on the contrary, apparently, a pixel could not be discriminated from the other because twice the distance of light scattering exceeded the width of the light shield between the pixels.

In the relations above, the scattering angle $\theta$ can be determined by using a cell of a general use PDLC electro-optical device equipped with a light source emitting a light of single wavelength. For example, a practically useful liquid crystal electro-optical device can be fabricated based on a scattering angle $\theta$ determined by using a He-Ne laser. That is, even if a liquid crystal electro-optical device were to be fabricated using the scattering angle $\theta$ above while controlling the other parameters as to satisfy eq. (1), pixels can be discriminated from each other with a sufficient clarity. Thus, it can be seen that a scattering angle having determined using a light source emitting a visible light of a single wavelength satisfactorily serves as a parameter for determining the light shield according to the present invention.

In FIG. 2, the light shield (the black stripe) is formed in the form of prism, and the width L of the light shield is a width of the prism and H of Table i is a height of the prism. Also, in FIG. 2, L of Table 1 is a distance between adjacent two of the electrodes in the same direction as the width of the light shield (the black stripe).

The present invention is illustrated in greater detail referring to non-limiting examples below. It should be understood, however, that the present invention is not to be construed as being limited thereto.

EXAMPLE 1

Figure 1:
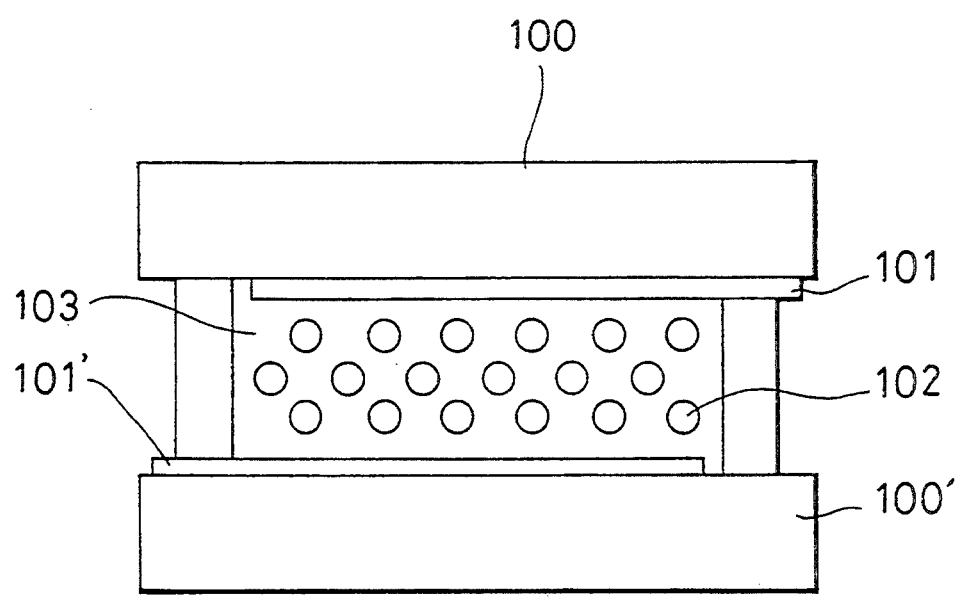
FIG. 1 shows schematically a structure of a PDLC cell of a conventional type.

A preliminary experiment was carried out to determine the parameters for fabricating the liquid crystal electro-optical device according to the present invention. Referring to FIG. 1, the preliminary experiment is described in detail first. A PDLC cell was fabricated in a manner shown schematically in FIG. 1. The degree of light scattering was measured on the same PDLC cell. Light-transmitting electrically conductive films 101 and 101' were established on light-transmitting substrates 100 and 100' by depositing, e.g., an oxide of indium and tin (ITO), zinc oxide, etc., using vapor deposition or sputtering to a thickness in the range of from 500 to 2,000 Å. In this example, an ITO film was used. The film has a sheet resistivity of from 20 to 200 $\Omega/cm^2$.

The ITO film was then patterned by a conventional photolithographic process. More particularly, the ITO film was covered with a resist resin of a predetermined pattern, and the uncovered portion of the conductive film was dissolved using an etchant to obtain a substrate coated with a patterned ITO. The etchant to be used in this step may be an aqueous hydrochloric acid solution, an aqueous solution of hydrochloric acid and nitric acid, or an aqueous solution of ferric chloride and hydrochloric acid. The etchant may be heated, if necessary, to about 60° C. to accelerate the reaction rate.

Then, spacers were scattered on the liquid crystal substrate thus obtained. The spacers maintain constant the spacing between substrates. Several tens of milligrams of spacers were weighed out, and were added into 50 ml of isopropyl alcohol. The dispersion thus obtained was sprayed on the substrate using a spinner or a spray to place from 10 to 200 spacers on the substrate. The substrate was then faced against the other substrate. In this manner, a cell having a cell spacing maintained at a constant value by means of spacers was fabricated.

A dispersion to give the electro-optical modulating layer was injected into the cell taking advantage of a capillary phenomenon or by making use of a vacuum process. The electro-optical modulating layer has a network structure which comprises a resin 103 and a number of liquid crystal droplets 102 being surrounded by the resin 103. In this example, BL-001 (liquid crystal material manufactured by BDH Corp.) having a refractive index (for ordinary light) of 1.521 and an anisotropy in refractive index of 0.225 was dispersed in an ultraviolet (UV) curable resin NOA065 (a product of Noland Co., Ltd.) having the same refractive index as that of the liquid crystal material (1.521) to obtain the dispersion for the electro-optical modulating layer. The liquid crystal undergoes phase transition from an isotropic phase to liquid crystal phase at 61° C.

It can be seen that the cell turns almost perfectly transparent when an electric field is applied to the cell, because the refractive index of the liquid crystal is adjusted to that of the polymer. In the scattering mode which is realized when no electric field is applied, a higher scattering can be expected by using a liquid crystal material having a larger anisotropy in the refractive index. It is therefore a key in producing a liquid crystal display that the refractive indices of the liquid crystal material and the resin are adjusted to make the best of the light transmittance in the powered state and the light scattering in the unpowered state.

Figure 4:
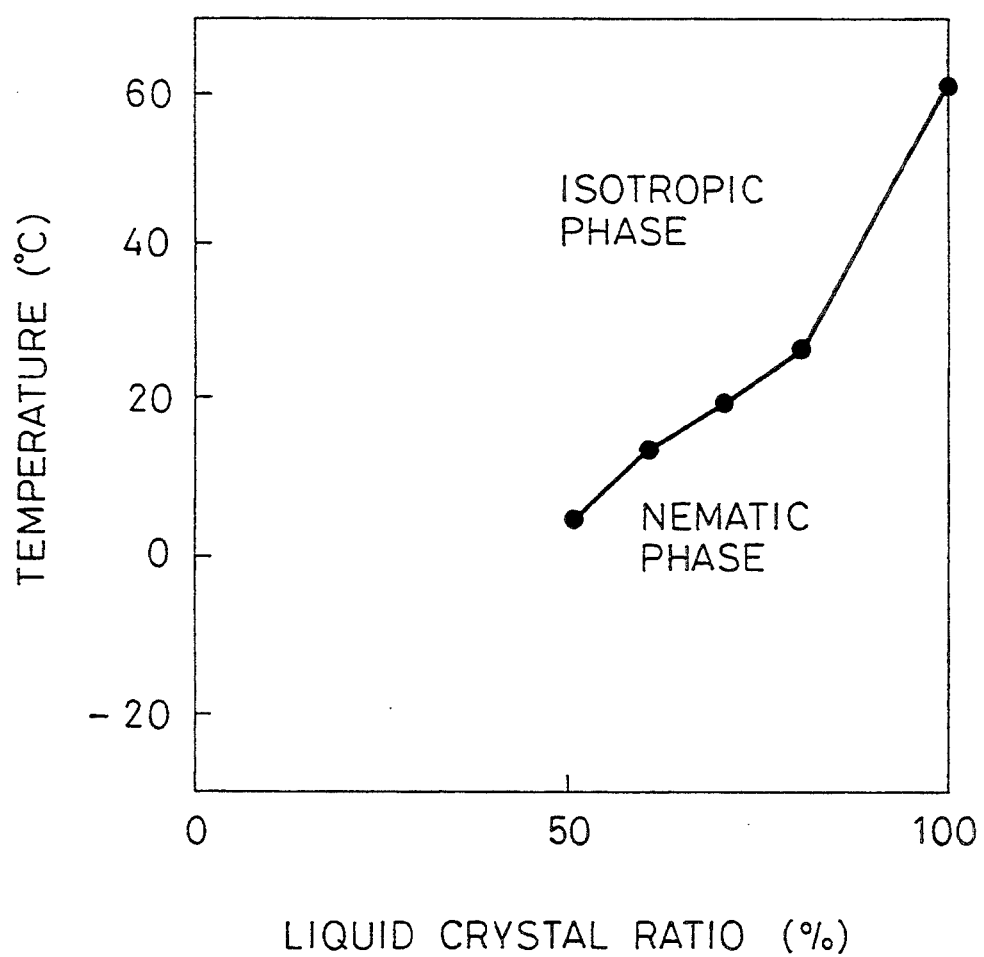
FIG. 4 shows the phase diagram of a liquid crystal used in Example 1 according to the present invention.

In FIG. 4 is given the change in temperature of phase transition from an isotropic phase to a liquid crystal phase with change in the mixing ratio of the liquid crystal material and the UV curable resin. A 7:3 mixture of liquid crystal and resin undergoes phase transition at 19° C. This 7:3 mixture of liquid crystal and resin was subjected to UV irradiation to obtain an electro-optical modulating layer. A mercury/xenon lamp was used as a UV light source. Spectroscopically, this lamp yields a maximum intensity at a wavelength of 365 nm. Upon irradiation of UV at an intensity of 10 mW/cm² the electro-optical modulating layer changed from a transparent state to an opaque milky white state after passage of 20 seconds. Thus it was confirmed that the electro-optical modulating layer changes its state to scatter light. At this time, since an electric field is not applied to the electro-optical modulating layer, major axes of the liquid crystal molecules of the electro-optical modulating layer are at random and the electro-optical modulating layer scatters (diffuses) a light incident thereon at an angle of $\theta$ of Table 1 or less.

Figure 5:
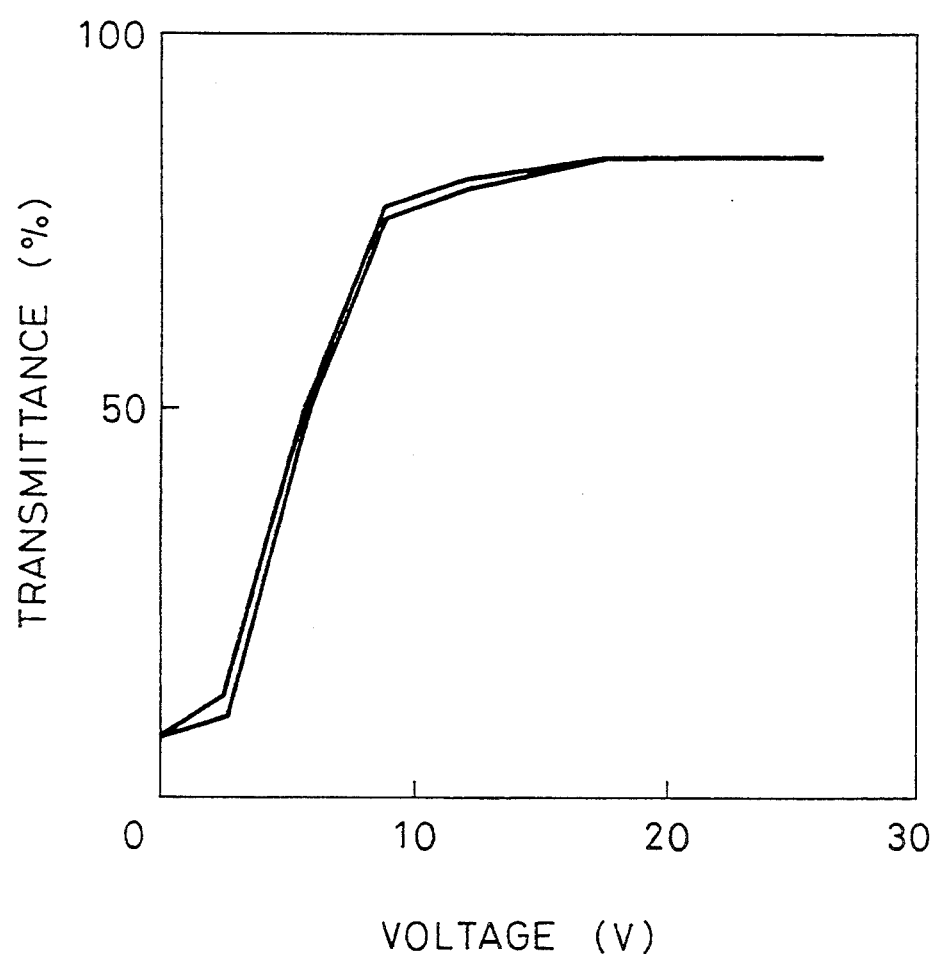
FIG. 5 shows the light transmittance—voltage curve of the PDLC used in Example 1 according to the present invention.

The above electro-optical modulating layer was washed with methanol to remove the liquid crystal material, and the structure of the layer was observed under a scanning electron microscope (SEM). The SEM observation revealed that the electro-optical modulating layer consists of a resin network containing liquid crystal materials being dispersed in pores 2 to 3 μm in size. The change in light transmittance of the PDLC cell with increasing applied voltage is shown in FIG. 5. It can be seen that the transmittance in the unpowered state of 3% abruptly increases to about 80% in the powered state, thus realizing favorably the light-scattering mode and a light-transmitting mode.

Figure 6:
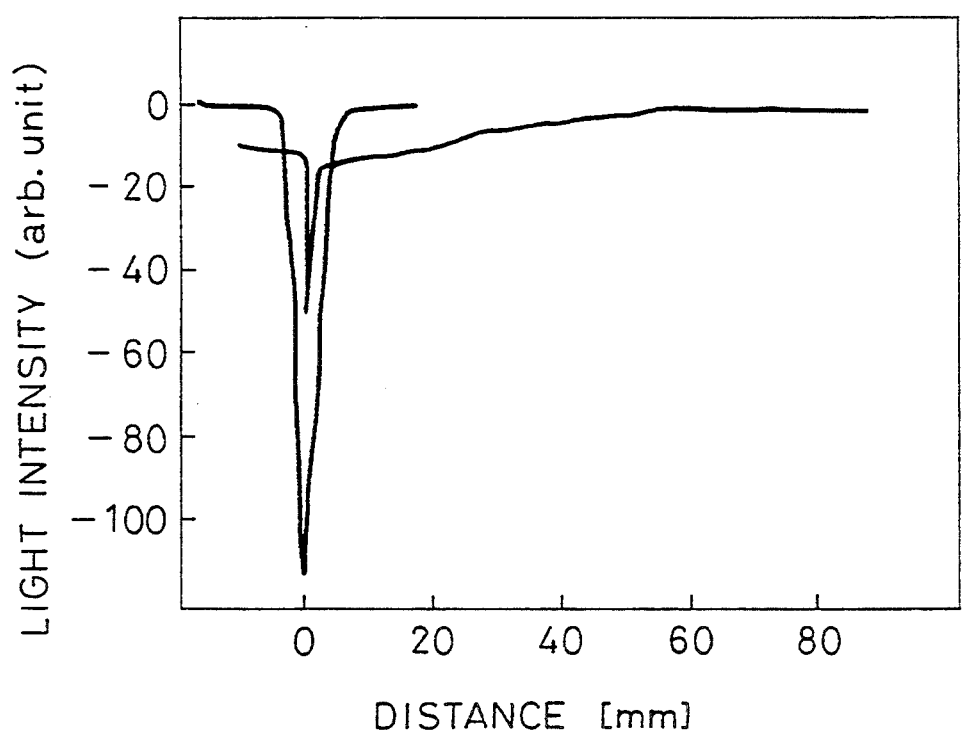
FIG. 6 is a graph showing light scattering properties of the PDLC used in Example 1 according to the present invention.

The light dispersion of the PDLC cell was measured by irradiating a He-Ne laser beam to the PDLC cell, and the light scattered from the cell was observed by the photomultiplier with the photomultiplier shifted along a direction vertical to the optical axis. In FIG. 6 is given the measured result. The light scattering of a blank (with no cells) was adjusted as such that the light intensity be approximately zero at a distance of about 3 mm from the center. On measuring the light scattering of the PDLC cell, it was found that a scattered light reached to as far as about 60 mm distant from the center. Considering that the cell was placed 100 mm away from the photodetector, the angle $\theta$ of light scattering was calculated from Eq. (3) below as 31°.

$$\theta = \tan^{-1}(60/100) = 31 \text{ deg} \qquad (3)$$

It should be noted, however, that the measurement had been done using a He-Ne laser; the value obtained is for a specific light at a wavelength of 632.82 nm. Because visible light generally include light in the shorter wavelength region, the angle of scattering tends to be larger than the value calculated above. In fact, however, the angle to the wavelength curve tends to be saturated at this value. Accordingly, this angle serves as a standard for assuming the other states in the shorter visible light wavelength region.

Once the parameters necessary for fabricating a liquid crystal electro-optical device are obtained through experimentation, a device as shown schematically in FIG. 2 can be fabricated.

Transparent conductive films 101 and 101' were deposited on transparent substrates 100 and 100'. The conductive films were then etched by a conventional photolithographic process into a predetermined pattern comprising a plurality of transparent electrodes, and columnar light shield portions (black stripes) 104 were established thereon e.g. in the form of prism. Black stripes were formed using photosensitive polyimide resins or acrylic resins for patterning, having mixed therein a black coloring pigment or dye.

In this manner, polymerization and crosslinking can be effected only on the resin portions subjected to photo-irradiation. The resin portions which were not irradiated with light remain uncured. Accordingly, the non-irradiated portions can be washed away with a solvent. First, a glass substrate was coated with a polyimide solution containing a black pigment by using a spinner, offset printing, or screen printing. Then, after firing the coating at a temperature range of from 80° to 120° C., UV was irradiated thereto through a photomask. The unnecessary portions were washed away with a solvent and subsequently the substrate was subjected to firing at 200° to 300° C. The resulting substrate was faced against another substrate having provided thereon a thin film transistor (TFT) based on polycrystalline silicon (polysilicon). The substrates were fixed to maintain a predetermined spacing therebetween to give a cell. A liquid crystal material was injected into the resulting cell in the same manner described above to obtain an electro-optical modulating layer for the PDLC. The cell dimension was selected as such to satisfy Eq. (1) above; the height of the black stripes, distance between the pixels, thickness of the electro-optical modulating layer, and the scattering angle were fixed accordingly to 5 $\mu$m, 5 $\mu$m, 10 $\mu$m, and 31 degrees, respectively.

The PDLC thus obtained according to the present invention had high light transmittance and provided a favorable display composed of clear pixels. A clear and favorable display was also obtained when the PDLC was used for projecting image on a wall.

EXAMPLE 2

In the aforementioned PDLC according to the present invention, the black stripes which serve as light shields increase their height with improving efficiency of light scattering, i.e., with achieving higher contrast. Accordingly, some problems are encountered in fabricating the PDLC by a conventional process. In a prior art fabrication process, substrates having provided thereon black stripes are laminated taking a predetermined spacing therebetween, and a liquid crystal material for the electro-optical modulating layer or a material containing a liquid crystal is injected between the substrates by a vacuum process. Then, the resulting cell is subjected to treatments such as UV irradiation. If such a prior art process is applied to the fabrication of a PDLC according to the present invention as described above, a very narrow gap results between the substrate and the black matrix because of the presence of black stripes. Then, it becomes difficult to inject the liquid crystal material between the substrate and the matrix. Even though a capillary phenomena were to be taken advantage, it still is a hard task to inject the liquid crystal dense into a narrow gap.

Figure 3:
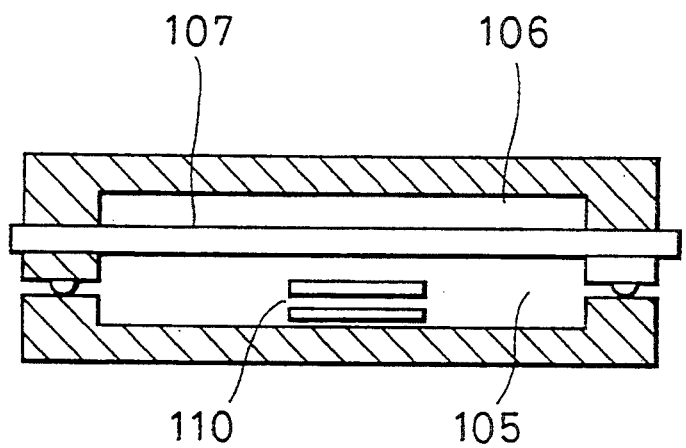
FIG. 3 shows schematically a laminator apparatus according to the present invention.

The aforementioned problem arises from the fact that a conventional process is applied to the fabrication of liquid crystal devices comprising substrates having large protrusions, such as those according to the present invention. Accordingly, the PDLC of the present invention is fabricated by using a laminator to manage fabrication using a substrate having high columnar black stripes. FIG. 3 is a schematic of a laminator apparatus. A laminator comprises two adjacent vacuum chambers partitioned by a partitioner 107 which can be moved by virtue of difference in pressure between the two adjacent vacuum chambers. A first transparent substrate comprising thereon high columnar black stripes and an electrode, is placed in a first chamber 105. Then, while dropwise supplying liquid crystal on the first substrate, a second substrate 110 is aligned and faced against the first substrate.

The first and the second chambers are evacuated simultaneously to vacuum, and the internal pressure of the second chamber alone is elevated to recover the atmospheric pressure. At this point, a pressure of about 1 atmosphere is applied to the substrate inside the first chamber ascribed to the pressure difference between the first and the second chambers. Thus, the liquid crystal material is pressed against the substrate to spread thereon. By taking such means, the liquid crystal material can be uniformly spread free from the aforementioned problems even though columnar light shields (black stripes) according to the present invention are established, because the substrates are faced against each other and then moved towards each other under pressure from a distance far larger than the height of the black stripes until the spacing between the substrates become as small as the size of the spacers being scattered between them. Thus, by taking advantage of the process described above, a liquid crystal panel free from non-injected portions and having a completely controlled cell thickness results even on a liquid crystal cell based on substrates having large irregularities such as the black stripes of the present invention.

A device fabricated by means of a laminator apparatus is explained below as an example, referring to a schematic given in FIG. 3. The laminator apparatus comprises a first chamber 105 and a second chamber 106 being separated with a silicon resin sheet 107. The silicon resin sheet 107 partition moves to the lower pressure side when a pressure difference generates between the chambers. In the present example, the cell was fabricated in the same manner as in Example 1. First, 5 $\mu$m size black stripes were formed in the form of prism on one transparent substrate 110. Next, resin spacers 10 $\mu$m in size were scattered on the substrate. A solution comprising a liquid crystal material was then provided dropwise over the black stripes on the substrate 110 having placed inside the first chamber of the laminator apparatus.

A second substrate equipped with a polysilicon-based TFT was provided in the first chamber and aligned and faced against the first substrate fabricated above with the solution therebetween by pressing the first substrate and the second substrate as follows. In the pressing step, the first and the second chambers of the laminator apparatus which were partitioned by a partitioner were evacuated at the same time with a rotary pump to a pressure of 1/10 Torr. At this point, the pressure inside the second chamber was increased to recover the atmospheric pressure. The first substrate and the second substrate are pressed by virtue of difference in pressure between the first chamber and the second chamber. In this manner, a liquid crystal layer having a thickness defined by the spacer as 10 $\mu$m was obtained. A UV light was irradiated to the cell in the next step to establish a PDLC layer. This treatment realizes a cell comprising two substrates being tightly adhered with each other by means of a PDLC electro-optical modulating layer. In practice, the outer periphery of the cell was fixed further with a UV curable resin. Thus was obtained a liquid crystal cell well endurable to reliability tests.

The PDLC thus obtained according to the present invention had high light transmittance and provided a favorable display composed of clear pixels. A clear and favorable display was also obtained when the PDLC was used for projecting image on a wall.

The electro-optical modulating layer was fabricated using a laminator in the present example. However, fabrication processes are not only restricted to this one and other processes such as a one comprising previously forming an electro-optical modulating layer on one of the substrates by a printing process and the like, and then finishing it into a liquid crystal electro-optical device by superposing the other substrate thereto may be employed as well.

As described in the foregoing, the use of a PDLC comprising black stripes of controlled height enables a PDLC device composed of clear and well discriminated pixels free from light leakage. As a result, an advantageous characteristics of a PDLC, i.e., a bright display having a high light transmittance was fully exhibited. Accordingly, each pixel provided a sharp image, and a very clear display as a whole was realized.

While the invention has been described in detail and with reference to specific embodiments thereof, it will be apparent to one skilled in the art that various changes and modifications can be made therein without departing from the spirit and scope thereof.

What is claimed is:

1. An electro-optical device comprising:
    a pair of substrates;
    a plurality of electrodes provided on one of said substrates;
    an electro-optical modulating layer provided between said substrates and comprising liquid crystal molecules which have a diffusion angle $\theta$; and
    light shield means provided between said substrates for decreasing transmission of a light from one pixel of the electro-optical device to an adjacent pixel, said shield means having a height H satisfying the equation $2(D-H)\tan\theta < L$ where D is a distance between said substrates, L is a width of said shield means, and $\theta$ is said diffusion angle when the major axes of said liquid crystal molecules are at random.

2. The device of claim 1 wherein said substrates are transparent.

3. The device of claim 1 wherein said electro-optical modulating layer diffuses a light incident thereon at an angle of $\theta$ or less when said major axes are at random.

4. The device of claim 1 wherein said light shield means comprises a black stripe.

5. The device of claim 4 wherein said black stripe comprises a black pigment or a black dye and a polyimide resin or an acrylic resin.

6. The device of claim 4 wherein said black stripe is formed in the form of prism.

7. The device of claim 6 wherein said width of said light shield means is a width of said prism.

8. The device of claim 6 wherein H is a height of said prism.

9. The device of claim 1 wherein said electro-optical modulating layer comprises a resin and said resin surrounds a number of liquid crystal droplets comprising said liquid crystal molecules.

10. The device of claim 1 wherein said electrodes are transparent.

11. The device of claim 1 wherein L is a distance between adjacent two of said electrodes in the same direction as said width of said part.

12. A method for forming an electro-optical device comprising the steps of:
    forming a black stripe having a height sufficient to prevent scattered light from interfering with an adjacent pixel of the electro-optical device on a first substrate;
    applying a solution comprising a liquid crystal to said first substrate over said black stripe; and
    providing a second substrate on said first substrate with said solution therebetween by pressing said first substrate and said second substrate.

13. The method of claim 12 wherein said providing step is carried out by providing said first substrate in a first chamber after said forming step, providing said second substrate in said first chamber after said applying step, evacuating said first chamber and a second chamber which are partitioned by a partitioner, and increasing pressure inside said second chamber.

14. The method of claim 13 wherein said partitioner can be moved by virtue of difference in pressure between said first chamber and said second chamber.

15. The method of claim 13 wherein said first substrate and said second substrate are pressed by virtue of difference in pressure between said first chamber and said second chamber.

16. The method of claim 13 wherein the evacuation of said first chamber and said second chamber is carried out at the same time.

17. The method of claim 12 wherein said solution comprises a curable organic material.

18. The method of claim 17 further comprising the step of curing said organic material so that said liquid crystal is dispersed in the cured material.

19. The method of claim 12 wherein said height of said black stripe is determined by the equation $2(D-H)\tan\theta < L$ wherein H is said height of said black stripe, D is a distance between said first and second substrate, L is a width of said black stripe, and $\theta$ is a diffusion angle when the major axes of said liquid crystal molecules are at random.

20. The method of claim 12 wherein said liquid crystal is a PDLC.

21. A liquid crystal electro-optical device comprising:
    at least one substrate;
    an electrode arrangement formed on said substrate;
    a liquid crystal light modulating layer located adjacent to said electrode arrangement, said light modulating layer having a plurality of pixels therein defined by said electrode arrangement; and
    light blocking means provided between adjacent pixels of said light modulating layer to prevent scattered light from interfering with an adjacent pixel of said light modulating layer.

22. The device of claim 21 wherein said liquid crystal light modulating layer is operating in a light scattering and non-scattering mode.

23. The device of claim 21 wherein said liquid crystal light modulating layer comprises a polymer dispersed liquid crystal.

24. The device of claim 21 wherein said light modulating layer is provided with a thin film transistor at each pixel.

* * * * *